United States Patent [19]

Pakulski

[11] Patent Number: 4,633,440
[45] Date of Patent: Dec. 30, 1986

[54] MULTI-PORT MEMORY CHIP IN A HIERARCHICAL MEMORY

[75] Inventor: Francis J. Pakulski, Shelburne, Vt.

[73] Assignee: International Business Machines, Armonk, N.Y.

[21] Appl. No.: 687,807

[22] Filed: Dec. 31, 1984

[51] Int. Cl.<sup>4</sup> .............................................. G11C 13/00
[52] U.S. Cl. ................................... 365/189; 365/220; 365/230
[58] Field of Search ............... 365/220, 221, 189, 230, 365/49, 73, 77, 219

[56] References Cited

U.S. PATENT DOCUMENTS 4,402,067  8/1983  Moss et al. ........................... 365/219
4,489,381 12/1984  Lavallee et al. ...................... 364/200

OTHER PUBLICATIONS

Matick et al., "All Point Addressable Raster Display Memory", IBM Journal of R&D, vol. 28, No. 4, Jul. 84, pp. 379-392.

Primary Examiner—Terrell W. Fears
Attorney, Agent, or Firm—Sughrue, Mion, Zinn, Macpeak & Seas

[57] ABSTRACT

A hierarchical memory system in which a lower level transfers data serially to an upper level and in parallel to a yet lower level. The lower level includes a two-port memory chip having a wide buffer for parallel accesses to the memory array, to the yet lower level, and to a serial buffer. The serial buffer is serially accessed to the upper level simultaneously with accesses to the wide buffer.

3 Claims, 3 Drawing Figures

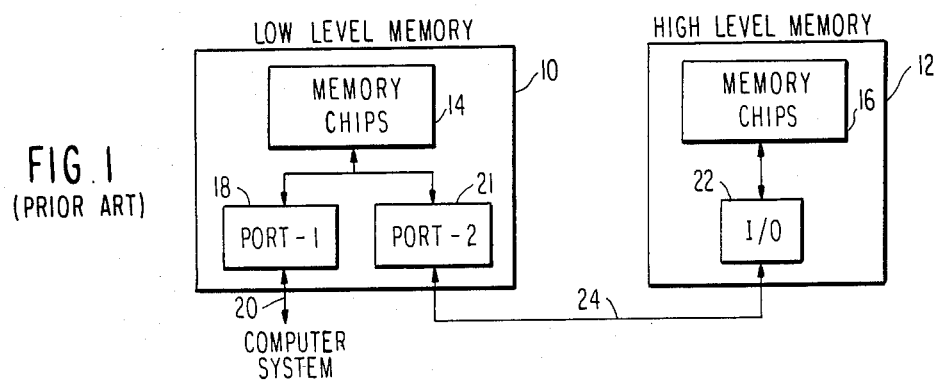
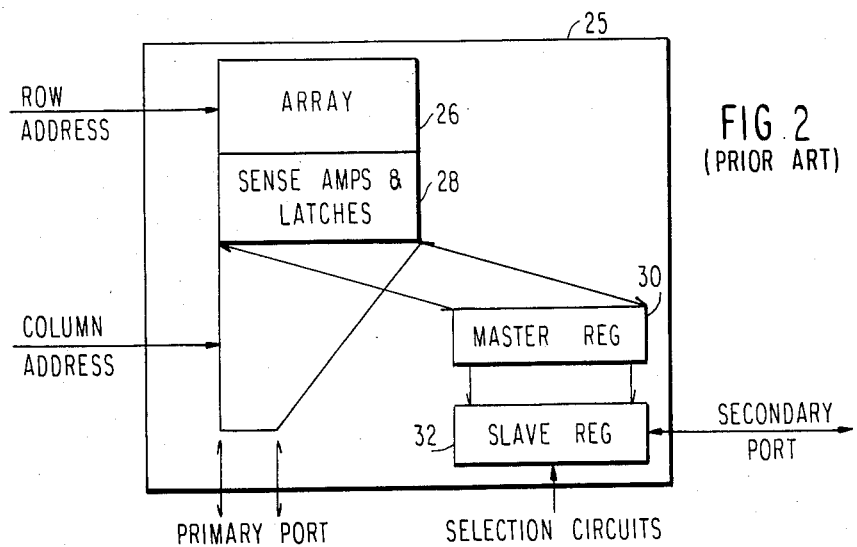
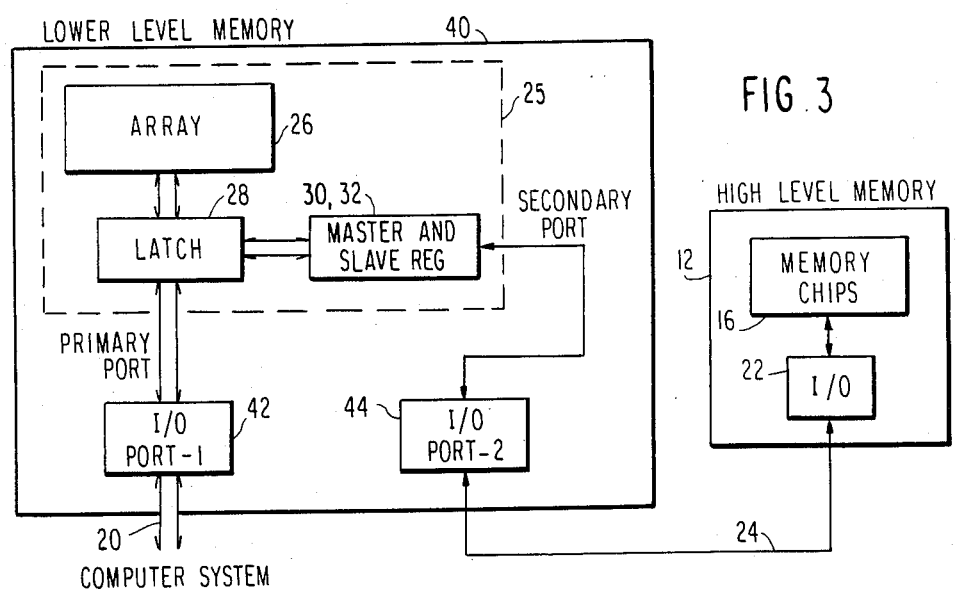

MULTI-PORT MEMORY CHIP IN A HIERARCHICAL MEMORY

BACKGROUND

This invention relates generally to computer memories. In particular, the invention is related to hierarchical memory systems.

Almost all computer systems include some type of memory. The predominant type of memory used for computer application is random access memory (RAM) although larger systems requiring vast amounts of memory storage typically include additional serial memory, usually in the form of magnetic tapes or discs. In simpler computer systems, the one or more memories are directly connected to the processor which then directly reads into and writes from a selected memory device.

However, there is a trend toward hierarchical memories in which a larger, higher level memory is not connected directly to the processor but instead transmits to and receives data from a lower level memory. The lower level memory receives data from and transmits data to, not only the higher level memory, but also the computer. A cache memory is one example of a lower level memory. The concept of multi-level memories may be extended to more than two levels of memory.

An example of a hierarchical memory is illustrated in FIG. 1, in which two memory cards 10 and 12 contain respectively a low level memory and a high level memory. Each card 10 or 12 contains an array of memory chips 14 and 16. Typically, the memory chips of the low level memory 10 are faster but of fewer number than the memory chips 16 of the high level memory 12. Thus the high level memory 12 is used for bulk storage while the low level memory 10 is used for its fast access and buffering capability. The low level memory 10 provides data from its memory chips 14 to the computer systems through a primary port 18 and a fast data channel 20. Similarly, the low level memory provides data to the high level memory 12 through a secondary port 21 which is connected to an I/O port 22 of the high level memory 12. The secondary port 21 and the I/O port 22 are connected by an inter-level channel 24. Data transmission on the two channels 20 and 24 can be done in either direction. In typical designs, the low level memory 10 can operate only one of its ports 18 and 21 at any one time. That is, the low level memory 10 either selects the primary port 18 for access by the data channel 20 to the computer system or alternatively selects the secondary port 21 for access by the inter-level channel 24 and the high level memory 12. The data channel 20 usually is a high speed channel, matched to the computer system, and is a parallel bus. In contrast, the inter-level channel 24 has a different channel capacity. The low level memory 10 provides buffering between the differing data rates on the two channels 20 and 24.

A disadvantage of the memory system of FIG. 1 is the lack of simultaneous access of the two ports 18 and 21 to the memory chips 14. While data is being accessed through the secondary port 21, either in a read or a write mode the memory chips 14 cannot be accessed by the data channel 20, thus impacting the operation of the fast paced computer system. Another disadvantage is that during the serial accesses through the secondary port 21, the memory chips 14 and their support circuitry need to be fully powered at a power level dictated by the inherent cycle time of the chip. As a result, the memory system of FIG. 1 is slow and also demands full power for each access.

Two patent applications, commonly assigned to the assignee of this application, disclose the use of dual ported memory chips in a hierarchical memory system. These applications are Ser. No. 405,812 filed Aug. 6, 1982 by Lavalee et al. (now U.S. Pat. No. 4,489,381) and Ser. No. 626,564 filed June 29, 1984 by Aichelmann et al.

SUMMARY OF THE INVENTION

Accordingly, an object of this invention is to provide simultaneous multiple access to a lower level memory in a hierarchical memory system, thus increasing the availability of the lower level to the system.

A further object of this invention is to provide access to a memory chip at differing data rates.

Yet a further object of this invention is to provide both a serial and parallel access to a memory.

A yet further object of this invention is to provide access to a memory chip without requiring full power for each access.

The invention is a hierarchical memory system in which the memory chips of a lower level are two-port memory chips. Data is accessed randomly from the memory chip to a primary buffer. Data can be transferred between the primary buffer and a secondary buffer within the memory chip. The primary buffer and the secondary buffer can be independently and simultaneously accessed from outside the chip. A parallel access to the primary buffer is used for accesses to the computer system or a yet lower memory level. Accesses to the secondary buffer are performed serially and are made available to a higher level memory.

BRIEF DESCRIPTION OF THE DRAWINGS

FIG. 1 is a block diagram of a hierarchical memory system in the prior art.

FIG. 2 is a schematic diagram of a two-port memory chip usable with the present invention.

FIG. 3 is a block diagram of one embodiment of the hierarchical memory of the present invention.

DETAILED DESCRIPTION OF THE PREFERRED EMBODIMENT

The present invention uses a two-port memory chip in its hierarchical memory. Several varieties of multi-port chips have recently been developed. For instance, Nordling et al. in U.S. Pat. No. 4,410,964 discloses a memory device with two ports, each with multiple bits. Rao in U.S. Pat. No. 4,347,587 discloses a memory chip with both parallel and serial ports. However, in this chip, the serial port is associated only with a portion of the memory dedicated to the serial port. Ackland et al. in U.S. Pat. No. 4,412,313 discloses a two-port chip in which a shift register is connected to the parallel output lines and can provide a high speed serial output. Baltzer in U.S. Pat. No. 4,150,364 discloses a somewhat different memory system in which two memory chips can be simultaneously accessed.

A two-port memory chip 25 particularly useful for the present invention is illustrated in FIG. 2. This type of chip is described by R. Matick et al. in a technical article entitled "All Point Addressable Raster Display Memory" appearing in the IBM Journal of Research and Development, Vol. 28, No. 4, July 1984 at pp. 379–392. Data is stored in a memory array 26 in long words of 128 bits. Each 128-bit word can be randomly accessed by a row address. The individual words are accessed through sense amplifiers and latches 28 which thus serve as a primary buffer to the memory array 26. The 128-bit word in the latches 28 is further subdivided into smaller bytes, typically of from 2 to 4 bits apiece. Each byte in the latches 28 is randomly accessed by a column address for a transfer to or from the 4-bit wide primary port. Data in 128-bit words can also be transferred in parallel between the latches 28 and a master register 30. In order to decouple the transfer word from the latches 28, the master register 30 can be accessed by a slave register 32 by the parallel transfer of the 128-bit word. Selection circuits control the slave register 32 so that it can be accessed serially through a secondary port. All the previously described transfers can occur in either direction.

In the two-port memory chip 25, the slave register 32 can be accessed through the secondary port independently of the access of the latches 28 through the primary port. For instance, a word can be read from the array 26 into the latches 28 and then transferred through the master register 30 to the slave register 32. Thereafter, this word can be read serially from the slave register 32 out through the secondary port. Simultaneously with the serial access through the secondary port, the latches 28 can be accessed by the primary port. Additional words can be read from the array 26 into the latches 28 and then outputted through the primary port, all during the reading of the single word in the slave register 32 out of the secondary port. Furthermore, multiple words can be read into the array 26 from the primary port while the secondary port is operating in the write direction. For a fairly high speed chip, the parallel access through the primary port may be operating at a cycle rate of 80–150 ns per word while the serial access through the secondary port is not likely to exceed a cycle rate of 20 ns per bit. For 128-bit words, the secondary port is thus cycling at 1.56 $\mu$s per word, thus permitting many accesses of data through the primary port in the same time that one complete word is accessed through the secondary port.

One embodiment of the present invention uses the two-port memory chip 25 in a hierarchical memory system illustrated in FIG. 3. Similar elements to those of FIG. 2 are numbered with the same reference numerals and will not be further discussed. The twoport memory chip 25 is included in a lower level memory card 40. The master register 30 and the address and selection lines are not explicitly shown in FIG. 3. The primary port of the memory chip 25 is connected through a first I/O port 42 to the data channel 20 to the computer system. This I/O port 42 could be up to 4-bits wide in present technology for the described memory chip 25. The secondary port of the memory chip 25 is connected through a second I/O port 44 to the inter-level channel 24 to the high level memory 12.

It is seen that the computer system can simultaneously access the latch 28 while the high level memory 12 is accessing the slave register 32. Thus the slave register 32 can be accessed relatively slowly over the serial inter-level channel 24 for one word while several words can be accessed between the array 26 and the computer system through the latch 28. The accesses can be any combination of reading and writing. Of course, when the access to the slave register 32 has been completed, a subsequent access to the slave register 32 would require either a read from or a write to the array 26. This subsequent access necessarily involves the latch 28 so that the the accessing through the primary port to the computer system is necessarily interrupted. However, the duration of this interruption of the primary port is only a small fraction of the total access time through the secondary port. The simultaneous operation of the primary and the secondary ports eliminates significant waiting time caused by data transfers between levels and can lead to significant improvements in overall performance of the hierarchical memory system.

Compared to the hierarchical memory system of FIG. 1, the present invention offers several advantages. The improved performance by a simultaneous access to the two ports provides improved performance. During those periods when only the secondary port is being accessed and no data is being transferred between the slave register 32 and the array 26, the I/O port 42 associated with the primary port and the sense amplifiers and latches 28 can be depowered. This depowering reduces both the average and the peak power levels required for the lower level memory card 40. This reduced power results in a lower operating temperature than for the conventional approach. The reduction in temperature is expected to be about 10° C. Because of the depowering, the lower level memory 40 is expected to have improved reliability, predicted to be about a 20% reduction in cumulative failures. The use of serial memory in the memory chip 16 of the higher level memory 12 provides a cost reduction because a serial access memory can be made at lower cost than RAM.

Although the lower level memory 40 of FIG. 3 has been described as consisting of a single memory chip 25, the invention can be applied to a lower level memory 40 of multiple memory chips, each having two ports connected respectively to the I/O parts 42 and 44. The different memory chips can either be separately selected depending upon the address or can be operating in parallel to provide different bits of an addressed word.

It should be noted that the memory organization for the lower level memory 40 of FIG. 3 is not appropriate if the slave register 32 is not on the same memory chip as the memory array 26. Such an off-chip slave register would require an inordinate number of I/O pins from the latch 28 to the off-chip slave register. Furthermore the simultaneous transfer of so many bits of data across the chip boundary would create a power surge if it were performed between different chips.

The described embodiment assumes a controlled transfer of data between the latch 28 and the slave register 32. However, in some applications where the flow of data is predictable, any access of array 26 through the primary port could be designated to cause an automatic transfer of data with the slave register 32 for a corresponding access through the secondary port.

I claim:

1. A hierarchical memory system having at least two levels comprising a first and second memory chip, the first memory chip being the higher level memory and the second chip being the lower level memory, said second chip comprising:

a memory array with a primary buffer;

master and slave registers as a secondary buffer, connected to the primary buffer, said slave register being bidirectionally coupled for data transfer to the master register and to said first memory chip;

said system further comprising:

means for serially transferring an entire row of memory information between the first chip and the slave register on said second chip in a selected direction;

means for simultaneously transferring in a random access an entire row of memory information between said memory array and said primary buffer in a selected direction;

means for transferring information between the master register and the slave register; and means for accessing of said master and slave registers from outside said second chip.

2. A hierarchical memory system as recited in claim 1, wherein said row is subdivided into sub-rows and said accessing means includes means for randomly accessing each sub-row of information of the row of information in said primary buffer.

3. A hierarchical memory system as recited in claim 1, wherein said means for transferring information between said primary and secondary buffers simultaneously transfers an entire row of information.

* * * * *